INVENTORS:
GERRIT SCHUUR
CAREL J. BREUKINK
BY: *William H. Myers*
THEIR AGENT 3,551,243
METHOD OF PRODUCING A LAMINATED FOAMED THERMOPLASTIC SHEET
Gerrit Schuur and Carel J. Breukink, Delft, Netherlands, assignors to Shell Oil Company, New York, N.Y., a corporation of Delaware
Filed Feb. 6, 1968, Ser. No. 703,379
Claims priority, application Great Britain, Feb. 20, 1967,
Int. Cl. B29d 23/04
U.S. Cl. 156—244                                    6 Claims

ABSTRACT OF THE DISCLOSURE

A method for the formation of a structure comprising a foamed thermoplastic sheet adhered to a non-foamed sheet such as paper or film is provided which comprises extruding foam sheet and, while at least the surface thereof is above the softening point of the thermoplastic, compressing the foam sheet and liner sheet together to an extent of at least 75% of its volume prior to compression.

---

Figure 1:
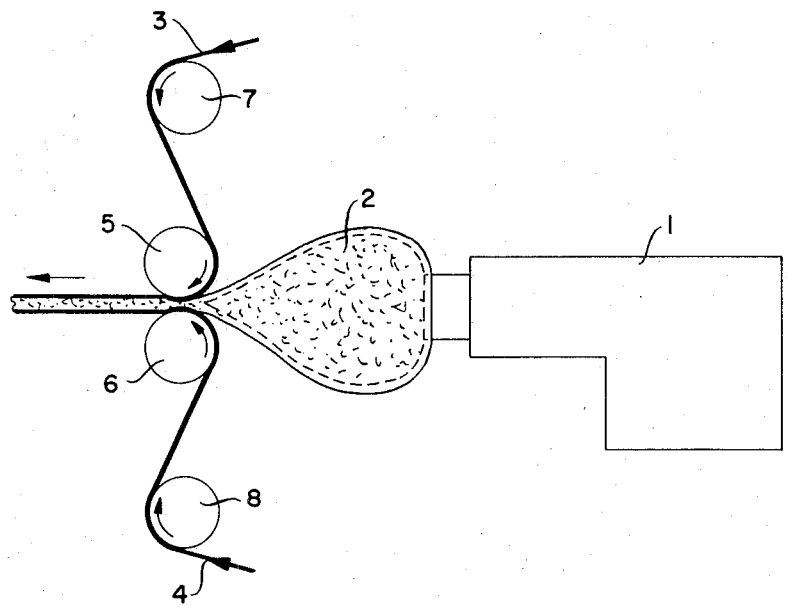

This invention relates to a method of producing a laminated foamed thermoplastic sheet. It has been suggested earlier to produce a laminate by applying a sheet of paper, textile or other lining material in light-pressured contact with a foamed thermoplastic sheet while the surface of the foamed sheet in contact with the sheet of paper is heated to a temperature at which the paper and foam under the light pressure are bonded together.

It has been found that the temperature conditions for applying such method in a continuous manner are rather critical. If too much heat is applied to the foamed sheet a relatively large portion of the foam material collapses whereby the thickness of the foamed sheet is reduced unduly and often the surface of the sheet turns into a brittle skin layer. The surface of the foam should therefore not be heated more than is strictly required to obtain a strong bond between the foam and the lining material.

In the method referred to above the pressure applied between the two sheets of material during the bonding operation is very small in order not to crush the cells of the foam. The bonding is carried out in a continuous and simple manner by simultaneously passing the foamed sheet and the liner through the nip of a pair of heated rolls which provide the necessary heat and pressure for the liner to be bonded to the foamed sheet. Since these rolls may be only in light pressured engagement with the materials passing through the nip thereof a problem of providing adequate heat-transport from the heated rolls through the paper to the contiguous foam surface arises, in particular when high lamination speeds are desired. This heat transport can be improved in principle by raising the temperature of the rolls, or by preheating the paper before its application on the foam, but a limitation is soon reached by approaching the maximum temperature which the paper or other liner material can endure without damage. Furthermore, the accumulated heat in the paper sheet is likely to melt too much of the surface material of the foam, either during or after the bonding operation. Another possibility is to preheat the foam surface before it is being laminated, but in general this has been found an unsatisfactory practice, which can be attributed to a large extent to the difficulty of providing inflammable vapors of the volatilized foaming agent, area of the foam. In this respect it is noted that the foam is very sensitive to small variations in temperature over its surface in the sense that this will lead to thickness variations as a result of non-uniform further expansions of the foam by the heating. Moreover the use of radiant heat sources may be dangerous in an atmosphere containing inflammable vapors of the volatilized foaming agent, as will normally surround the freshly extruded foam sheet.

The object of the invention is to provide an improved lamination process allowing high production speeds while providing a laminate with a strong adherent bond between the layers thereof.

Accordingly, the invention provides a method of producing a laminated foamed thermoplastic sheet, comprising extruding foamed thermoplastic sheet material, applying a liner sheet to the foamed sheet material in a continuous operation with the extrusion of the foam, firmly pressing the liner sheet and foam material together to the extent that the foamed sheet material is compressed by more than 75%, and heating the surface of the foam so that when the liner sheet and foam are being pressed together, the surface of the foam facing the liner sheet is at a temperature above the softening point of the foam material. Preferably, the average foam temperature when the liner is pressed thereto is as near as possible to the extrusion temperature, although the lamination process of the invention can be carried out with foam of much lower temperature, for example, 50–60° C. below the extrusion temperature.

Typical of the invention is that the lamination is carried out continuously with the extrusion of the foam in a so-called in-line process, in which the extruded length of foam is laminated subsequent to its extrusion, without interruption. Thus, the speed at which the foamed sheet is being laminated need not be less than the speed at which this sheet is extruded. The speed of lamination is often even higher than the extrusion speed since the extruded sheet may be subject to a stretching operation before or during its lamination. It will be clear that the in-line process allows a much simpler lay-out than would be necessary when the extruded length of foam would first have to be cut into shorter lengths, which would be laminated at a later time, or when the foam would first be cooled down to a much lower temperature.

In the method of the invention the foam is being compressed while the temperature throughout the foam is one at which the foam is flexible, allowing high compression without crushing of its cells, or if any such crushing might perhaps take place during the initial part of the compression the foam structure is apparently restored during the further compression since the end product does not have a crushed cell structure.

The final thickness of the foamed sheet after the lamination process is often greater than before as a result of further expansion of the extrudate by the heat applied to the foam in the laminating operation. The invention is of particular advantage in this respect, since the cells of the foam shortly after the extrusion still contain a large percentage of vaporized foaming agent which easily expands further under the external heat supplied in the lamination process. This will result in a foam of low density, as is usually desirable. It is also clear that any heat retained by the foam after its extrusion reduces the necessary supply of heat in the lamination process. Extremely high compression ratios have been applied to the sheet with very good results. The high compression has two important consequences: first, the intense and extensive contact between the compression means and the materials being bonded therebetween results in a high rate of heat being transferred from the compression means to the foamed material, and, second, the liner sheet is firmly pressed to the foamed sheet resulting in a strong bond. Therefore, high speeds of lamination have been possible of 6–8 m./min. and more. The foam surface contiguous to the liner sheet need not have reached its softening temperature at the first moment that the two materials contact each other for the necessary heat may partly be provided by the heated paper, which heats the foam while it is in contact therewith.

The thermoplastic which may be used in forming the foamed sheet may be any of the thermoplastic materials including not only traditional materials such as polystyrene, polyurethanes high impact polystyrene, polyolefins (polyethylene, polypropylene or their copolymers) high-styrene butadiene-styrene copolymers, and the thermoplastic elastomers such as block copolymers of styrene and butadiene, especially those having the structure polystyrene-polybutadiene-polystyrene, or mixtures thereof.

The sheet material (which is in the form of a non-foamed sheet) to be bonded to the foam sheet may be paper or other non-woven textile, thermoplastic sheeting of the polymers listed as useful in forming the foamed sheet component.

The invention will further be illustrated with some examples.

EXAMPLE I

Foamed polystyrene sheet material in tubular form was extruded through an annular orifice having a diameter of 125 mm. and a width of 2.1 mm. The feed to the extruder was of the following composition: (percentages by weight) 93.4% polystyrene, 4.8% n-butane, 1.6% isobutane, 0.1% sodium bicarbonate, and 0.1% citric acid. The butane, serving as a foaming agent, was injected as a liquid directly into the extruder at a point downstream of the hopper through which the other components were supplied. The temperature of the foam on being extruded was 106° C., and its density near the extrusion die before being stretched was 39 g./l. The foamed tubular extrudate was passed as a flat tube or double sheet between a pair of heated compression rolls. One advantage of the use of rolls for the compression in the lamination process is that these rolls may simultaneously be used for stretching of the foam in the longitudinal direction by a pulling action of these rolls on the incoming foam sheet. The situation is clarified in FIG. 1 of the accompanying drawing, in which the extruder is represented by numeral 1, the foamed polystyrene tube by numeral 2, and the compression rolls by numerals 5 and 6. The foam tube between the rolls 5 and 6 and the extruder 1 was slightly inflated by air supplied through a conduit within the extruder to stretch the foam material. An upper sheet 3 and a lower sheet 4 of kraft paper were passed over heated rolls 7 and 8, respectively, and from there between the compression rolls 5 and 6, together with the foam material. Each of the sheets of paper was 0.25 mm. thick and weighed 180 g./m.² Just before the rolls 5 and 6, the flat foam tube had a width of 77.3 cm. and a (total) thickness of 7.0 mm. At this moment the surface temperature of the foam was approximately 60° C., and its density 47 g./l. The speed at which the foamed sheet and the paper sheets passed the compression rolls was 5.2 m./min. The temperature of the rolls 5 and 6 was 160° C. and their distance from the extruder 120 cm. The temperature of the rolls 7 and 8 was also 160° C. The diameter of the rolls was 30 cm.

Figure 2:
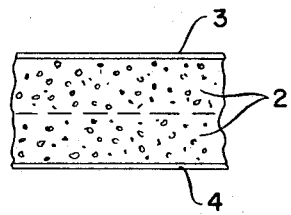

Between the compression rolls 5 and 6 the paper sheets were bonded to the foam surface, and at the same time the two inner flat faces of the collapsed foam tube 2 were fused together. A section through the obtained laminate is shown in FIG. 2.

The spacing of the rolls 5 and 6 was made adjustable in order to determine the effect of various compression ratios on the quality of the obtained laminate. The compression is calculated with the formula:

$$C = 100 - \frac{s}{d} \times 100$$

in which

C is the compression of the foam, in percent,
s is the spacing between the rolls minus the combined thickness of the paper sheets, in mm.,
d is the thickness of the foam just prior to entering the nip of the rolls 5 and 6, in mm.

The heat supplied to the foam by the rolls 5 and 6 had for results that in most tests the thickness of the foamed sheet after having passed the rolls 5 and 6 was greater than before.

The results obtained with various spacings of the compression rolls are tabulated below. A good bond between the paper and foam means that the paper could not be removed from the foam without tearing.

| Spacing of compression, mm. | Compression of foam, C, percent | Thickness of foam in the laminate, mm. | Quality of the bond between paper and foam |
|---|---|---|---|
| 2.5 | 71.4 | 8.9 | Poor. |
| 1.9 | 80.0 | 8.2 | Moderate. |
| 1.5 | 85.7 | 7.6 | Good. |
| 1.3 | 88.6 | 6.7 | Good. |

In all tests the bond between the two foam layers was very satisfactory.

EXAMPLE II

The conditions and materials in the example were the same as in Example I, with the exception that the temperature of the compression rolls 5 and 6 and also of rolls 7 and 8 had been reduced to 150° C., whereas on the other hand the lamination speed had been raised to 6.0 m./min. The (total) thickness of the foam just before its lamination was 6.0 mm.

The results are given in the following table.

| Spacing of compression rolls, in mm. | Compression of foam, in percent | Quality of the bond between paper and foam |
|---|---|---|
| 1.0 | 91.7 | Poor. |
| 0.9 | 93.3 | Poor. |
| 0.8 | 95.0 | Moderate. |
| 0.7 | 96.7 | Good. |

The above table shows that under the more severe laminating conditions of this example with respect to the previous one (lower temperature of rolls and higher speed) a good bond could still be obtained by increasing the pressure between the paper and foam, resulting in extremely high compressions of the foam between the compression rolls. The maximum allowable compression under the present circumstances was found to be about 98%, since above this limit the thermoplastic material turned into a dense plastic mass no longer capable of expansion into a regular foam compression is probably slightly less than the one calculated from the given equation in view of the compressibility of the paper liners on the foam, which for a high compression of the foam may become of some significance.

It was found that when the temperature of the compression rolls was raised, for example to 160° C., the maximum allowable compression became less than 98%.

EXAMPLE III

The tests of this example were carried out wtih the same material and conditions as stated under Example I, with the following differences:
(1) the upper sheets were 0.27 mm. thick and weighed 210 g./m.²,
(2) the densisty of the inflated foam tube was 63 g./l., and the only foaming agent used as iso-pentane (7.2% by weight),
(3) lamination speed was 6.2 m./min.
(4) width of foam sheet just before the compression rolls 82 cm.,
(5) total thickness of foam sheet just before the compression rolls 4.1 mm., (6) temperature of compression rolls 170° C.

| Spacing of compression rolls, mm. | Compression of foam, percent | Quality of bond between paper and foam |
|---|---|---|
| 1.6 | 74.1 | Poor. |
| 0.9 | 91.2 | Good. |

We claim as our invention:

1. Method of producing a laminated foam thermoplastic sheet, comprising extruding a hollow tube of foamed thermoplastic sheet material and simultaneously inflating said hollow tube, immediately applying a liner sheet to the foamed inflated hollow tube in a continuous operation with the extrusion of the foam by passing said liner sheet and said inflated hollow tube while said tube is in the inflated condition through the nip of a pair of rollers with the surface of the inflated hollow tube facing the liner sheet being at a temperature above the softening point of the thermoplastic foam material and simultaneously during passage of said liner sheet and said inflated hollow tube through said nip heat fusing together the contacting surfaces of said liner sheet and said hollow tube and firmly pressing the liner sheet and hollow foam tube together to the extent that the foamed tube is compressed by more than 75% of its thickness just prior to being pressed.

2. Method as claimed in claim 1, wherein the average temperature of the foam just before the liner is pressed thereon is not more than 60° C. below the extrusion temperature of the foam.

3. Method as claimed in claim 1, wherein the liner sheet is pressed on the foam with a pressure which compresses the foamed sheet material by more than 85%.

4. Method as claimed in claim 2, wherein the liner sheet is pressed on the foam with a pressure which compresses the foamed sheet material by more than 90%.

5. Method as claimed in claim 2, in which the liner sheet is pressed to the foamed material by simultaneously passing the liner sheet and foamed material between heated compression rolls.

6. A method according to claim 2 wherein the foamed thermoplastic is polystyrene.

References Cited

UNITED STATES PATENTS

| 3,094,449 | 6/1963 | Sisson | 156—244X |
| 3,159,698 | 12/1964 | Suh et al. | 156—244X |
| 3,277,221 | 10/1966 | Parrish | 156—244UX |

CARL D. QUARFORTH, Primary Examiner

H. E. BEHREND, Assistant Examiner

U.S. Cl. X.R.

156—229